United States Patent [19]

Young

[11] 3,898,815

[45] Aug. 12, 1975

[54] PRESSURE AND VOLUME COMPENSATING SYSTEM FOR RECIPROCATING OIL FIELD DRILLING TOOLS

[75] Inventor: James Whitehurst Young, Irving, Tex.

[73] Assignee: Dresser Industries, Inc., Dallas, Tex.

[22] Filed: Dec. 6, 1973

[21] Appl. No.: 422,240

[52] U.S. Cl.................. 64/23.7; 64/23 R; 175/321; 285/302; 277/176; 277/35
[51] Int. Cl.............................................. F16d 3/06
[58] Field of Search....... 64/23.7, 23, 9 A; 175/321; 285/302; 277/35, 124, 125, 173, 176

[56] References Cited
UNITED STATES PATENTS

| | | | |
|---|---|---|---|
| 2,456,081 | 12/1948 | Penick | 277/124 |
| 3,225,566 | 12/1965 | Leathers | 64/23 |
| 3,345,832 | 10/1967 | Bottoms | 175/321 |
| 3,406,537 | 10/1968 | Falkner | 64/23 |
| 3,467,394 | 9/1969 | Bryant | 277/124 |

Primary Examiner—Samuel Scott
Assistant Examiner—Randall Heald
Attorney, Agent, or Firm—Eddie E. Scott

[57] ABSTRACT

A reciprocating torque transmitting well tool is disclosed that includes an outer member and an inner member telescopically arranged. A spline means between said outer member and said inner member transmits torque. A spring means is positioned between the outer member and the inner member. A first seal means provides a fluid seal between said outer member and said inner member. A second seal means spaced from said first seal means provides a fluid seal between said outer member and said inner member. At least one of said seal means can move axially between said outer member and said inner member. The axial movement of the seal means accomplishes at least two functions. The first function is that as the external pressure increases, the seal means can move inwardly to compress any trapped air to the point that a pressure balance is maintained at all times. The second function is to accommodate variations in volume created by the drive mandrel as it moves axially within the tool housing.

3 Claims, 4 Drawing Figures

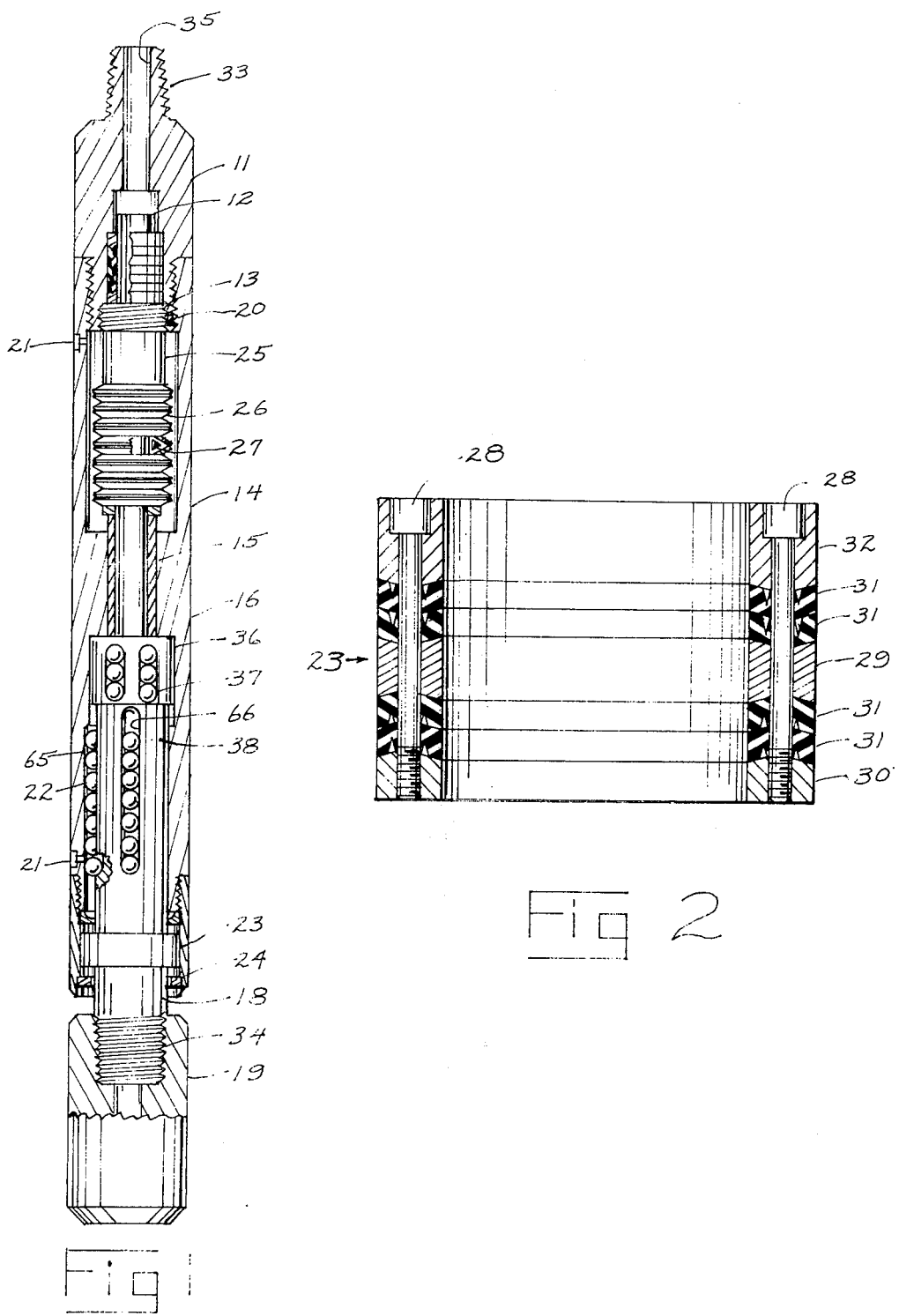

PRESSURE AND VOLUME COMPENSATING SYSTEM FOR RECIPROCATING OIL FIELD DRILLING TOOLS

BACKGROUND OF THE INVENTION

The present invention relates to a torque transmitting well tool that is subjected to reciprocating forces and more particularly to a pressure and volume compensating system for a reciprocating well tool.

Many torque transmitting reciprocating well tools contain a lubricant between the reciprocating members. Seal means prevent the lubricant from escaping. Pressure differentials occurring in the reciprocating well drilling tool apply large forces on the seal means and can result in early failure of the tool. For example, pressure differentials occur in reciprocating well tools as the result of the tools being filled at atmospheric pressure and then being exposed to extremely high hydrostatic pressure at various drilling depths. Pressure differentials can also be the result of thermal expansion experienced by the oil contained in a tool when high bottom hole temperatures are encountered. Many of the reciprocating drilling tools have different areas at the sealed ends. If both ends are exposed to approximately the same pressure, the resulting inward force can be extremely high as a result of the area differential.

Some of the difficulties encountered by prior art reciprocating well tools are described in U.S. Pat. No. 2,972,471 to R. A. McClintok et al, patented Feb. 21, 1961. Said patent describes an invention of this character wherein the packing elements are of the same diameter so as to eliminate the necessity for a floating seal. Said patent indicates that movement, or floating, of the packing element is undesirable. The present invention provides a seal means that is free to float to provide pressure and volume compensation.

DESCRIPTION OF PRIOR ART

In U.S. Pat. No. 2,891,772 to A. B. Segelhorst patented June 23, 1959, an oil well jar-sealed type device is shown. The oil well jar is sealed or packed off at both the top and the bottom so that the wearing parts therein are thus protected against intrusion of abrasive material which might be found in a well.

In U.S. Pat. No. 2,972,471 to R. A. McClintok et al patented Feb. 21, 1961, an oil-sealed drilling bumper sub is shown. The bumper sub includes means for sealing out abrasive and corrosive matter from the operating mechanism of said sub. The packing elements are the same diameter so as to eliminate the necessity for a floating seal. By having the packing elements the same diameter, the fluid chamber defined by said elements will be such that when the parts of the tool are telescoped or extended, one of the fluid chambers will increase in size to the same extent that the other chamber decreases in size.

In U.S. Pat. No. 2,721,026 to L. W. Storm, patented Oct. 18, 1955, a hydraulic well jar is shown. The jar comprises inner and outer telescopically arranged tubular parts. The parts are moveable longitudinally relative to each other and form between them a closed fluid chamber. Sealing means, such as O-ring seals, form a fluid-tight seal between the inner and outer telescopically arranged tubular parts. A restriction within the chamber and a piston whose annulus is slightly smaller than the restriction provides means for providing a jarring action to an object stuck in the bore of a well. Upon movement of the piston into the restriction, the flow of liquid past the piston is restricted so that further relative movement of the upper and lower parts takes place very slowly resulting in the development of tension or compression in the operating string. As the piston moves out of the restriction, the relative movement of the parts is no longer restrained and the parts move suddenly to the limit of the relative movement to produce a jarring action. Means are provided to permit a rapid movement of the parts to replace the tool in condition for jarring operation upon relative movement of the parts in the other direction. In one embodiment, a coil spring or other equivalent resilient member is disposed in a space bearing at one end against the upper member and at the other end against the piston to urge the piston downward.

In U.S. Pat. No. 3,429,389 to B. Q. Barrington, a jar tool including a mandrel telescopically mounted within a barrel and a fluid reservoir interposed between the mandrel and the barrel is shown. A sleeve, slideably mounted on the mandrel within the reservoir serves to initially provide a seal between the mandrel and the barrel as a relatively low pressure is developed within the reservoir. As pressure within the reservoir is intensified to a high level, the sleeve separates from the mandrel to provide a restricted flow passage enabling movement of the mandrel to proceed on a highly impeded basis.

SUMMARY OF THE INVENTION

The present invention provides compensation for pressure differential between the pressure of lubricant in a drilling tool and the pressure of fluid surrounding the drilling tool. The tool includes an outer member and an inner member telescopically arranged. Spline means between the outer member and the inner member transmits torque between the two members. The lubricant is retained inside of the drilling tool by first and second seal means. Means are provided for allowing said seal means a limited amount of axial movement. The above and other objects and advantages of the present invention will become apparent from a consideration of the following detailed description of the invention when taken in conjunction with the drawings.

BRIEF DESCRIPTION OF THE DRAWINGS

FIG. 1 is a longitudinal view, partly in section and partly in elevation of one embodiment of a drilling tool constructed in accordance with the present invention.

FIG. 2 is an enlarged view of a portion of the drilling tool shown in FIG. 1.

DETAILED DESCRIPTION OF THE INVENTION

Figure 3:
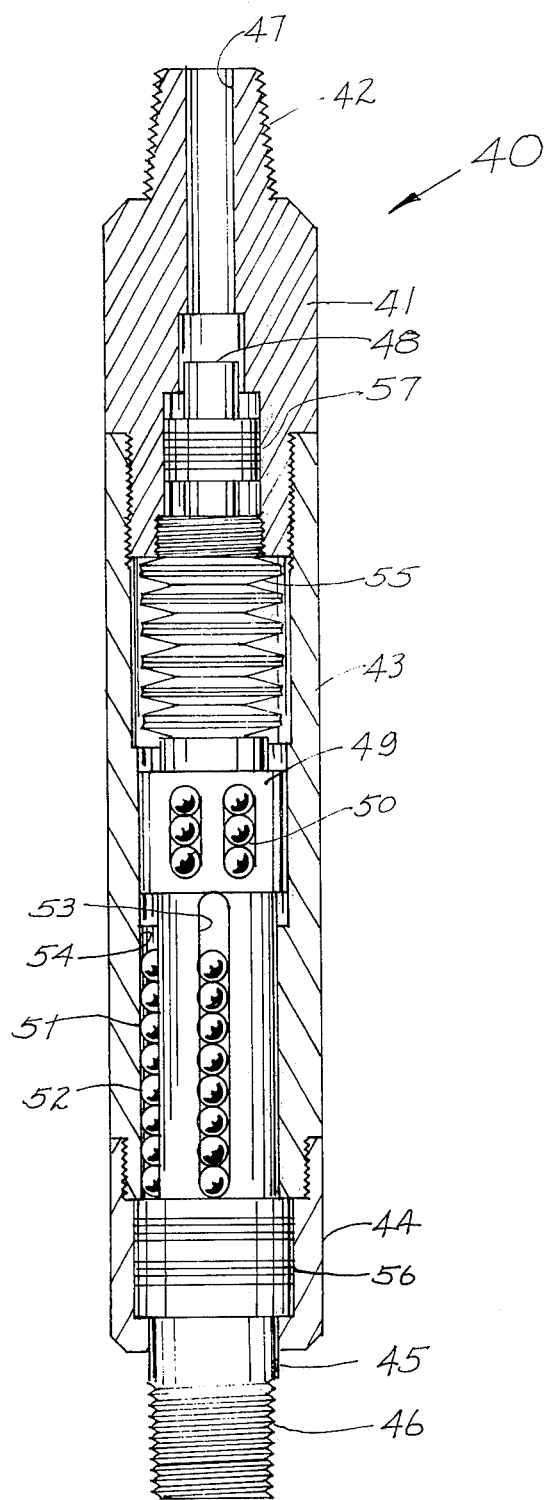
FIG. 3 is a longitudinal view, partly in section and partly in elevation, of another embodiment of a drilling tool constructed in accordance with the present invention.

Referring now to the drawings, and in particular to FIG. 1, a drilling tool is shown therein and generally designated by the reference number 10. The drilling tool 10 is an impact tool adapted to be positioned between the section of the drill string that includes the drill bit (not shown) and the section of the drill string (not shown) connected with the drilling equipment at the surface. During drilling the action of the bit on bottom generates oscillations in the drill string mass suspended above the bit. The impact tool 10 utilizes the oscillations to provide a hammering effect that is transmitted to the bit.

The tool 10 includes a top packing sub 11. The top packing sub 11 is adapted to be connected to the portion of the drill string connected with the surface equipment. The threaded connection 33 allows the tool 10 to be easily connected to or disconnected from the drill string. The top packing sub 11 is threaded into a spring sub 14. The spring sub 14 is threaded into a spline sub 16 and the spline sub 16 is threaded into a bottom seal sub 17. A drive mandrel 18 fits within the tool 10. The drive mandrel 18 includes a threaded connection 34 for connecting the drive mandrel 18 to a bit sub 19. A wash pipe 12 is threaded into the drive mandrel 18. The unit consisting of the drive mandrel 18 and the wash pipe 12 has limited movement within the housing consisting of the bottom seal sub 17, the spline sub 16, the spring sub 14, and the top packing sub 11.

Drilling fluid is transmitted through the tool 10 during drilling. Drilling fluid enters the passage 35 in the top packing sub 11 from a section of drill string above the tool 10. The drilling fluid continues through a central passage in the wash pipe 12, through a central passage in the drive mandrel 18, and is transmitted to the bit sub 19 below the tool 10.

A ball spline 36 on the drive mandrel 18 is located between the spline sub 16 and the drive mandrel 18. The ball spline 36 includes a series of carrier balls 37 that reduce friction and facilitate relative longitudinal movement of the drive mandrel 18 and the spline sub 16. A ball spline 38 is positioned between the drive mandrel 18 and the spline sub 16 to transmit torque from the drive mandrel 18 to the spline sub 16. The ball spline 38 includes a series of carrier balls 22 that transmit torque between a spline element 65 on spline sub 16 and a spline element 66 on drive mandrel 18.

A series of disc or "Belleville" springs 26 are positioned between a spring spacer 25 and a sleeve 15. The springs 26 receive the oscillations created by action of the bit and produce a hammering effect that is transmitted to the bit. A lubricant is maintained in the area around the springs 26, carrier balls 37, and carrier balls 22. Lubricant may be introduced into the tool 10 through ports 21. Top packing seals 39 provide a dynamic fluid seal between the wash pipe 12 and the top packing sub 11. A packing nut 13 holds the seals 39 in position. A set screw 20 locks the packing nut 13 in place. A floating seal assembly 23 provides a dynamic fluid seal between the bottom seal sub 17 and the drive mandrel 18.

Referring now to FIG. 2, an enlarged view of the floating seal assembly 23 is shown. The floating seal assembly 23 includes a multiplicity of seal elements 31 positioned between a top adapter 32 and a bottom adapter 30. The top and bottom adapters are connected together by a series of bolts 28. A center adapter 29 is positioned between groups of seal elements 31. The seal elements 31 on one side of the center adapter 29 are positioned with their lips extending toward the top adapter 32 and the seal elements 31 on the other side of the center adapter 29 are positioned with their lips toward the bottom adapter 30. This provides a dynamic fluid seal in both axial directions.

Referring now to both FIGS. 1 and 2, the floating seal assembly 23 is allowed a limited amount of axial movement within the bottom seal sub 17. The floating seal assembly 23 provides a barrier between the lubricant within the tool 10 and the external fluid outside the tool 10. Axial movement of the floating seal assembly 23 accomplishes at least two things. The first is that as the external pressure increases, the floating seal assembly 23 can move inwardly as required to compress any trapped air to the point that a pressure balance is maintained at all times. Second, the floating seal assembly 23 can move axially within the housing to compensate for volume variations created by movement of the drive mandrel 18.

Referring now to FIG. 3, a drilling tool is shown therein and generally designated by the reference number 40. The drilling tool 40 is adapted to be positioned between the section of drill string that includes the drill bit (not shown) and the section of the drill string that connects the drill bit to the drilling equipment at the surface. The drilling tool 40 is a shock sub. The shock sub 40 maintains a spring force coupled into the drill string assembly in such a manner that shock loads resulting from action of the bit are absorbed and prevented from being transmitted up the drill string. The shock sub 40 minimizes fatigue on the drill bit, the drill string, and the surface equipment.

The shock sub 40 includes an upper packer sub 41. The upper packer sub 41 is adapted to be connected to the portion of the drill string extending from the surface equipment. The threaded connection 42 allows the shock sub 40 to be easily connected to or disconnected from the drill string. The upper packer sub 41 is threaded into a spline sub 43 and the spline sub 43 is threaded into a lower packer sub 44. A drive shaft mandrel 45 fits within the lower packer sub 44, the spline sub 43, and the upper packer sub 41. The drive shaft mandrel 45 includes a wash pipe 48 and a threaded connection 46 for connecting the drive shaft mandrel 45 to the section of drill string including the bit. The drive shaft mandrel 45 and wash pipe 48 have limited movement within the housing consisting of the lower packer sub 44, the spline sub 43, and the upper packer sub 41. Drilling fluid is transmitted through the shock sub 40 during drilling. Drilling fluid enters the passage 47 in the upper packer sub 41 from a section of drill string above the shock sub 40. The drilling fluid continues through a central passage in the wash pipe 48, through a central passage in the drive shaft mandrel 45, and is transmitted to the section of the drill string below the shock sub 40.

A ball spline 49 on the drive shaft mandrel 45 is located between the spline sub 43 and the drive shaft mandrel 45. The spline sub 43 includes a series of carrier balls 50 that reduce friction and facilitate relative longitudinal movement of the drive shaft mandrel 45 and the housing consisting of the upper packer sub 41, the spline sub 43 and the lower packer sub 44. A ball spline 51 is positioned between the drive shaft mandrel 45 and the spline sub 43 to transmit torque from the housing consisting of the upper packer sub 41, the spline sub 43, and the lower packer sub 44. The ball spline 51 includes a series of carrier balls 52 that transmit torque between spline grooves 53 in the drive shaft mandrel 45 and spline grooves 54 in the spline sub 43.

A series of disc or Belleville springs 55 are positioned between the upper packer sub 41 and the drive shaft mandrel 45. The spring 55 absorbs the shock loads resulting from the action of the bit. A lubricant is maintained in the area around the springs 55, the ball spline 49, and the ball spline 51. Lower packer seals 56 provide a dynamic fluid seal between the lower packer sub 44 and the drive shaft mandrel 45 to retain lubricant in the area of the springs 55 and ball splines 49 and 51. A seal unit 57 provides a dynamic fluid seal between the upper packer sub 41 and the drive shaft mandrel 45 to retain lubricant in the area of springs 55 and the ball splines 49 and 51.

Figure 4:
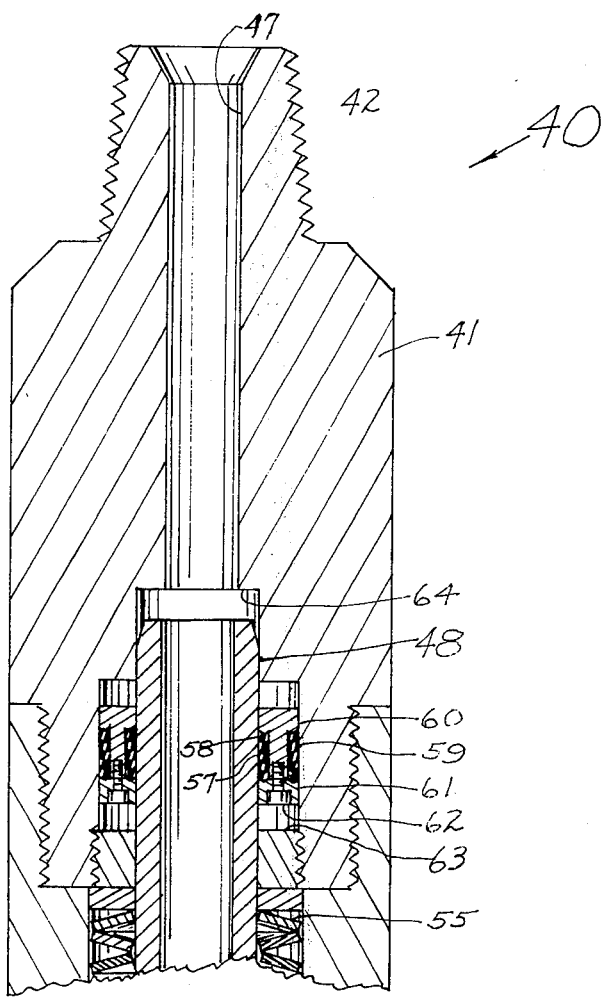
FIG. 4 is an enlarged view of a portion of the drilling tool shown in FIG. 3.

Referring now to FIG. 4, an enlarged view of a portion of the shock sub 40 is shown. The seal unit 57 is positioned between the drive shaft mandrel 45 and the upper packer sub 41. The seal unit 57 consists of an inner set of Chevron-type seals 58 and an outer set of Chevron-type seals 59. The seal sets 58 and 59 are positioned between a seal sleeve cap 60 and a seal sleeve adapter 61. A series of cap screws 62 lock the seal sleeve cap 60 to the seal sleeve adapter 61. This compresses the Chevron-type seals 58 and 59 to maintain a dynamic fluid seal. The seal unit 57 is allowed a limited amount of axial movement between a packer nut 63 and a shoulder 64 on the upper packer sub 41. The seal unit 57 is allowed a limited amount of axial movement and at the same time has the capacity to seal or provide a barrier between the inner lubricant and the external fluid. The ability to move in this fashion accomplishes at least two things. The first is that as the external pressure increases, the seal unit 57 can move inwardly as required to compress any trapped air to the point that a pressure balance is maintained at all times. Secondly, as a result of its geometry, the mandrel 45 displaces or adds to the internal volume as it moves axially within the tool housing. The volume capacity is varied by movement of the seal unit 57. It is to be understood that other seal units may be used in place of the seal unit 57. For example, the packing member shown in U.S. Pat. No. 3,627,335 to J. H. Wheeler, patented Dec. 14, 1971, could be used in place of seal unit 57.

The embodiments of the invention in which an exclusive property or privilege is claimed are defined as follows:

1. A reciprocating torque transmitting well tool for operation in a borehole filled with a borehold fluid, comprising:

an outer member;
an inner member, said outer member and said inner member being telescopically arranged;
spline means comprising a multiplicity of balls in matching raceways between said outer member and said inner member for transmitting torque;
a lubricating fluid between said inner member and said outer member;
spring means comprising a multiplicity of disc springs connected to said outer member and connected to said inner member;
first seal means between said outer member and said inner member for providing a fluid seal between said lubricating fluid and said borehole fluid; and
second seal means between said outer member and said inner member for providing a fluid seal between said lubricating fluid and said borehole fluid, said second seal means including a multiplicity of annular inner seals surrounding said inner member, a retainer element extending around said inner seals, a multiplicity of annular outer seals surrounding said retainer element, and means for providing said seal means with a limited amount of axial movement.

2. A reciprocating torque transmitting well tool for operation in a borehole filled with a borehole fluid, comprising:

an outer member;
an inner member, said outer member and said inner member being telescopically arranged;
spline means comprising a multiplicity of balls in matching raceways between said outer member and said inner member for transmitting torque;
spring means comprising a multiplicity of disc springs connected to said outer member and connected to said inner member;
first seal means between said outer member and said inner member for providing a fluid seal between said outer member and said inner member;
second seal means between said outer member and said inner member for providing a fluid seal between said outer member and said inner member, said second seal means comprising an upper retainer member, a lower retainer member, means connecting said upper and lower retainer members, a multiplicity of inner seal elements between said upper and lower retainer members surrounding said inner member, and a multiplicity of outer seal elements between said upper and lower retainer members surrounding a portion of said upper retainer member;
a lubricating oil between said first seal means and said second seal means; and
means for allowing said second seal means a limited amount of axial movement to provide pressure equalization between said lubricating oil and said borehole fluid.

3. The well tool of claim 2 wherein said second seal means includes an upper member, a lower member, means connecting said upper and lower member, and at least one seal element between said upper and lower member.

* * * * *